United States Patent
Heide et al.

(10) Patent No.: US 10,882,693 B2
(45) Date of Patent: Jan. 5, 2021

(54) HIGH-BAY WAREHOUSE WITH STORAGE-AND-RETRIEVAL UNITS PROVIDED THEREIN FOR STORING AND RETRIEVING, OR TRANSFERRING, ARTICLES

(71) Applicant: AMOVA GmbH, Netphen (DE)

(72) Inventors: Carsten Heide, Netphen (DE); Volker Brück, Mudersbach (DE)

(73) Assignee: AMOVA GmbH, Netphen (DE)

( * ) Notice: Subject to any disclaimer, the term of this patent is extended or adjusted under 35 U.S.C. 154(b) by 152 days.

(21) Appl. No.: 16/097,306

(22) PCT Filed: May 29, 2017

(86) PCT No.: PCT/EP2017/062831
§ 371 (c)(1),
(2) Date: Oct. 29, 2018

(87) PCT Pub. No.: WO2017/220285
PCT Pub. Date: Dec. 28, 2017

(65) Prior Publication Data
US 2019/0135539 A1    May 9, 2019

(30) Foreign Application Priority Data

Jun. 23, 2016    (DE) .................. 10 2016 211 301

(51) Int. Cl.
*G06F 7/00*      (2006.01)
*B65G 1/04*     (2006.01)
*B66F 9/07*     (2006.01)

(52) U.S. Cl.
CPC .............. *B65G 1/0435* (2013.01); *B66F 9/07* (2013.01); *B65G 1/0442* (2013.01); *B65G 2201/0232* (2013.01)

(58) Field of Classification Search
None
See application file for complete search history.

(56) References Cited

U.S. PATENT DOCUMENTS

| | | | |
|---|---|---|---|
| 2007/0039909 A1* | 2/2007 | DeMent | B61D 45/003 211/59.4 |
| 2015/0336472 A1 | 11/2015 | Tanaka | |
| 2016/0347543 A1* | 12/2016 | Heide | B66C 1/101 |

FOREIGN PATENT DOCUMENTS

| | | |
|---|---|---|
| CH | 554276 A | 9/1974 |
| CN | 102424226 A | 4/2012 |

(Continued)

Primary Examiner — Yolanda R Cumbess
(74) Attorney, Agent, or Firm — Smartpat PLC

(57) ABSTRACT

A high-bay warehouse for metal coils includes a plurality of storage modules. The storage modules are lined up in longitudinal rows and transverse in the depth directions thereof. The storage modules have a plurality of compartments arranged one above the other. Storage modules are separated by aisles extending parallel to a storage and retrieval sides of the storage modules. At least one storage-and-retrieval unit, which can be displaced back and forth, is provided in each aisle. The storage-and-retrieval units have a frame. On vertical uprights of the frame a lifting bridge is formed with at least one telescopic holder, which can be moved in and out in an orthogonally relative to the aisle. The storage-and-retrieval unit, on its at least one telescopic holder, has a C-shaped carrying which, beneath the telescopic holder, has a horizontally running pin which can be moved into a middle opening of the respective coil.

10 Claims, 5 Drawing Sheets

(56) References Cited

FOREIGN PATENT DOCUMENTS

| | | |
|---|---|---|
| CN | 204624472 U | 9/2015 |
| CN | 205076760 U | 3/2016 |
| DE | 29704341 U1 | 5/1997 |
| JP | S63185708 A | 8/1988 |
| JP | H0597206 A | 4/1993 |
| JP | H1159812 A | 3/1999 |
| JP | 2007062973 A | 3/2007 |
| TW | 201221445 A | 6/2012 |
| WO | 2014125727 A1 | 8/2014 |
| WO | 2015124342 A1 | 8/2015 |

\* cited by examiner

HIGH-BAY WAREHOUSE WITH STORAGE-AND-RETRIEVAL UNITS PROVIDED THEREIN FOR STORING AND RETRIEVING, OR TRANSFERRING, ARTICLES

TECHNICAL FIELD

The disclosure relates to a high-bay warehouse with storage and retrieval units provided therein for storing and retrieving or repositioning storage material.

BACKGROUND

High-bay warehouses for rolling mill products, particularly metal coils or wire coils, called metallic storage material for simplicity in the following, are known in various constructions and arrangements. Such high-bay warehouses may be integrated in the production sequence of a rolling train. It has become known through CH 554 276 to provide a respective high-bay warehouse at each the start and the end of a rolling train or at the start and the end of a finishing shop or as an intermediate store between two elongate workshops. Pallets are used for transporting wire coils or metal coils. The coils may be produced subsequently to a rolling process by winding up a rolled metal strip, which may for example be made of aluminum. Such coils can weigh 25 metric tons or more. The pallets are utilized in, for example, a circulatory system and roller paths, coil carriages or other such transport equipment providing further conveyance. The distribution of the supplied storage material in high-bay warehouses can be carried out by floor stackers movable in lanes. Those can optionally be combined with store cranes that are integrated in roof structures of the high-bay warehouse and reach over all lanes, or by a portal crane which moves on raised rails over the storage modules of the high-bay warehouse (cf. DE 297 04 341 U1), or the like.

An integrated fully automatic container transport system with storage and retrieval units, which are arranged in each lane and make access possible to each individual container—even with the floor stackers used—in a narrow form of construction of a high-bay warehouse, for a transshipment facility of a seaport or inland port is known from WO 2015/124342 A1.

The storage and retrieval units are of dimensionally narrow construction and store and retrieve the containers with the longitudinal sides thereof foremost in the rack bays. The storage and retrieval units are movable in floor-bound manner. The raising and lowering of the lifting bridges takes place by way of a cable traction device or a hoist, comprising a cable, cable drums, deflecting rollers, motors and transmissions. Load receiving means are provided at the lifting bridge or platform for transporting the containers which are suspended therefrom. The load receiving means are constructed in an extremely space-saving manner. The load receiving means are formed as telescopic holders which move in and out together with a suspended container.

The telescopic holder or holders is or are composed of a base housing or upper profile member, which is attached to the lifting bridge, and two telescopic thrust members arranged therein as center profile member and lower profile member. The center profile member or outer telescopic thrust member runs by outer guide profile members on either side on guide rollers of the base housing or upper profile member, and the lower profile member or inner telescopic thrust member runs by guide rollers, which are arranged on either side, in inner guide profile members of the outer telescopic thrust member or center profile member.

The invention has the object of enabling accelerated transshipment of coils and wire bundles with reduced outlay in a high-bay warehouse of the kind stated in the introduction through optimized transport and transfer means.

SUMMARY

The disclosure relates to a high-bay warehouse with storage and retrieval units provided therein for storing and retrieving or repositioning storage material. The storage material consists of coils of wound strips, particularly metal strips, or wire coils. The high-bay warehouse consists of a desired plurality of storage modules, which are arranged in rows. The storage modules extend in a longitudinal direction and in a depth (or width) direction transversely to the longitudinal direction. The storage modules comprise a plurality of rack bays disposed vertically one above the other. The modules are separated from one another by lanes extending parallel to storage and retrieval sides of the rack bays or storage modules. At least one storage and retrieval unit is provided in each lane and can move back and forth within the lane. The storage and retrieval units are constructed with a frame. The frame consists of vertical uprights which are connected by head and foot beams. A height of the frame corresponds at least with a height of the multi-floor storage modules. The vertical uprights guide a lifting bridge. The lifting bridge is moved by way of a drive and constructed with at least one telescopic holder. The telescopic holder is movable gradually in and out orthogonally to the lane for left-hand-side and right-hand-side servicing of the rack bays of the adjacent storage modules.

Accelerated transshipment of coils and wire bundles with reduced outlay in a high-bay warehouse is achieved in that the storage and retrieval unit is constructed at its at least one telescopic holder with a C-shaped carrier having below the telescopic holder a horizontally extending mandrel movable into the coil eye of the storage material.

In order to take over the storage material, which is conveyed to and positioned in the lanes, a mandrel, web, or the like is moved into the eye of the coil or the wire bundle. The mandrel, web or the like extends at a sufficient spacing—depending on the largest coil diameter to be managed, for example 2,400 millimeters—below the telescopic holder. The mandrel or web merely has to be moved into the coil eye until the bundle or the coil completely hangs on the mandrel of the storage and retrieval unit. The storage and retrieval unit then takes over the storage in the rack bays or with reversed movement sequences the retrieval from the rack bays without further intermediate conveying and transport means.

The C-shaped carrier is secured to the lower profile member or inner telescopic thrust member of the telescopic receiver mounted on the lifting bridge and can thus be gradually moved in, from the position retracted into the storage and retrieval unit, up to the end position in a rack bay, or conversely moved out.

I a preferred embodiment, the C-shaped carrier is connected with the lifting bridge by way of a rotary ring. At least one telescopic holder is secured to the rotary ring. Thereby, it is possible through simple rotation of the C-shaped support to service the rack bays of storage modules arranged to the left and right near the lane.

A further advantageous embodiment provides that a respective telescopic holder is provided on the rotary ring on the left-hand side and right-hand side. That is, the telescopic holder includes a left-hand side telescopic holder and a right-hand side telescopic holder. The telescopic holder are arranged on opposite sides of a vertical center axis of the storage and retrieval unit, which is coincident with a vertical center axis of the storage material. The C-shaped carrier consists of an angle arm, which extends from each telescopic holder with a kink in direction towards the vertical center axis and ends thereat. The mandrel is arranged at the intersection of the two angle arms.

By comparison with a telescopic holder provided centrally at the lifting bridge or rotary ring, the constructional height of the rack bays and, as a result, the storage modules and consequently the entire high-bay warehouse can thereby be appreciably reduced. That is, because in the free space obtained by the two mutually spaced telescopic holders with the symmetrically spread C-shaped carrier the rack bay receiver can be constructed with a trough-like depression adapted to the coil diameter, i.e. offering sufficient support not only to the smallest, but also largest coil diameter. The reduction in constructional height can amount to 500 millimeters and more per rack bay plane, which is accompanied by a substantial saving in steel construction.

A preferred design provides that the storage and retrieval unit is constructed for handling storage material below its travel plane with a frame-like passage opening in the foot beam.

This advantageously makes it possible for the storage and retrieval unit to be able to be movable above a transverse conveyor device crossing at least some lanes.

On the assumption that the lanes are arranged to extend parallel to the longitudinal sides (longitudinal sides of the high-bay warehouse) the transverse conveyor device or several transverse conveyor devices, which can be provided at a mutual spacing in distribution at the longitudinal sides, extends or extend at the floor side, i.e. at the warehouse floor or foundation, or in a pit-like depression of the foundation over the entire depth/width of the high-bay warehouse. The transverse conveyor device can consist of, for example, roller-path rollers, of which at least some are driven, on which the storage material deposited on pallets can run out directly in conveying direction and be positioned in the lanes. Optionally, use can be made of, for example, conveyor carriages or other such conveying means.

For handling of the storage material fed by way of a floor-side or recessed transverse conveyor device to the individual lanes of the high-bay warehouse the lifting bridge of the storage and retrieval unit movable directly above the lowermost rack bays or the lowermost rack bay plane is lowered until the mandrel of the telescopic holder is in alignment with the coil eye and then can be moved into the eye through gradual telescopic action. The storage material is thereafter taken over by the mandrel by raising the lifting bridge and conveyed, hanging therefrom, into the storage and retrieval unit by gradual telescoping of the telescopic holder. Subsequently, it can be brought by movement of the storage and retrieval unit in the lane to in front of a desired rack bay of the adjacent storage modules and after a 90° rotation either to the left or right stored in the desired rack bay by gradual telescopic action, whereupon the mandrel is telescoped back to its starting position so that the storage and retrieval unit is ready for a fresh storage and/or retrieval process, because the frame-like passage opening of the foot beam or travel frame also makes possible for the lifting bridge with the rotary ring and the at least one telescopic holder a free passage of the storage material, which is taken over below the travel plane, into the rack bay planes disposed thereabove. The transverse conveyor device can be combined with a return path to form a circulatory system, so that the empty pallets or conveyor carriages can be used in a circuit.

The handling of the storage material below the travel plane of the storage and retrieval unit is assisted by the fact that the vertical uprights of the unit frame are prolonged so as to end somewhat below the travel plane, which at the same time makes possible centered guidance of the descending or ascending lifting bridge over this downwardly prolonged path, for example by means of rollers supported at the prolongations.

According to an embodiment of the invention two rails extending at a horizontal spacing from one another either on the warehouse floor or elevated at a height above the transverse conveyor device, which is constructed from a row of successive storage modules at the lowermost rack bay plane and takes over the supplied storage material in a line, are associated with the storage and retrieval unit in each lane. Through placing of rails above the lowermost rack bay plane it is possible to convert a conventional high-bay warehouse in simple manner so as to provide a transverse conveyor device for conveying in the storage material.

BRIEF DESCRIPTION OF THE DRAWINGS

Further features and details of the invention are evident from the claims and the following description of embodiments of the invention illustrated in schematic drawings by way of the example of a high-bay warehouse with two-lane storage of coils.

DETAILED DESCRIPTION

Figure 1:
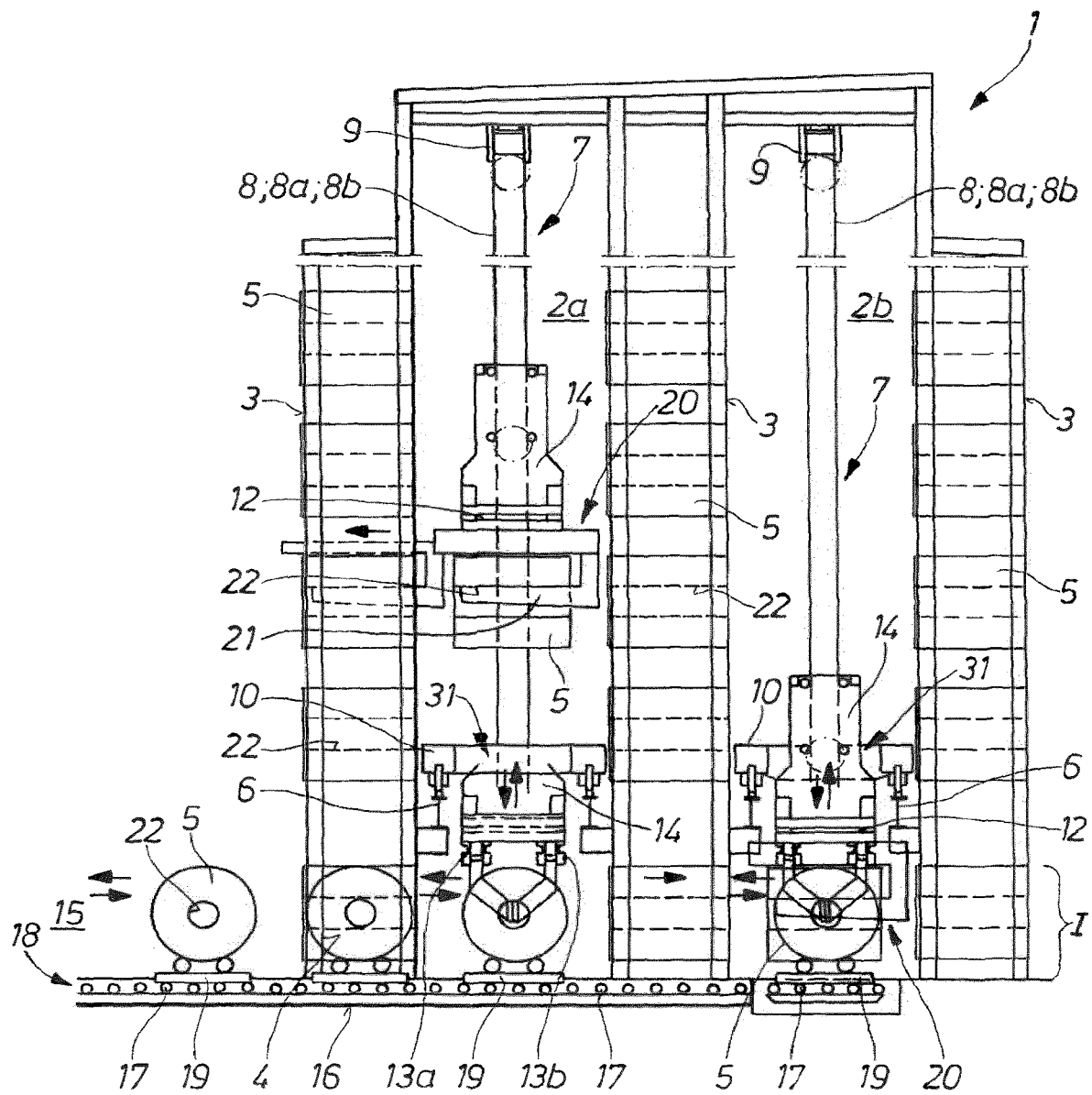
FIG. 1 shows a two-lane high-bay warehouse in cross-section as seen from the wide or deep side.
Figure 2:
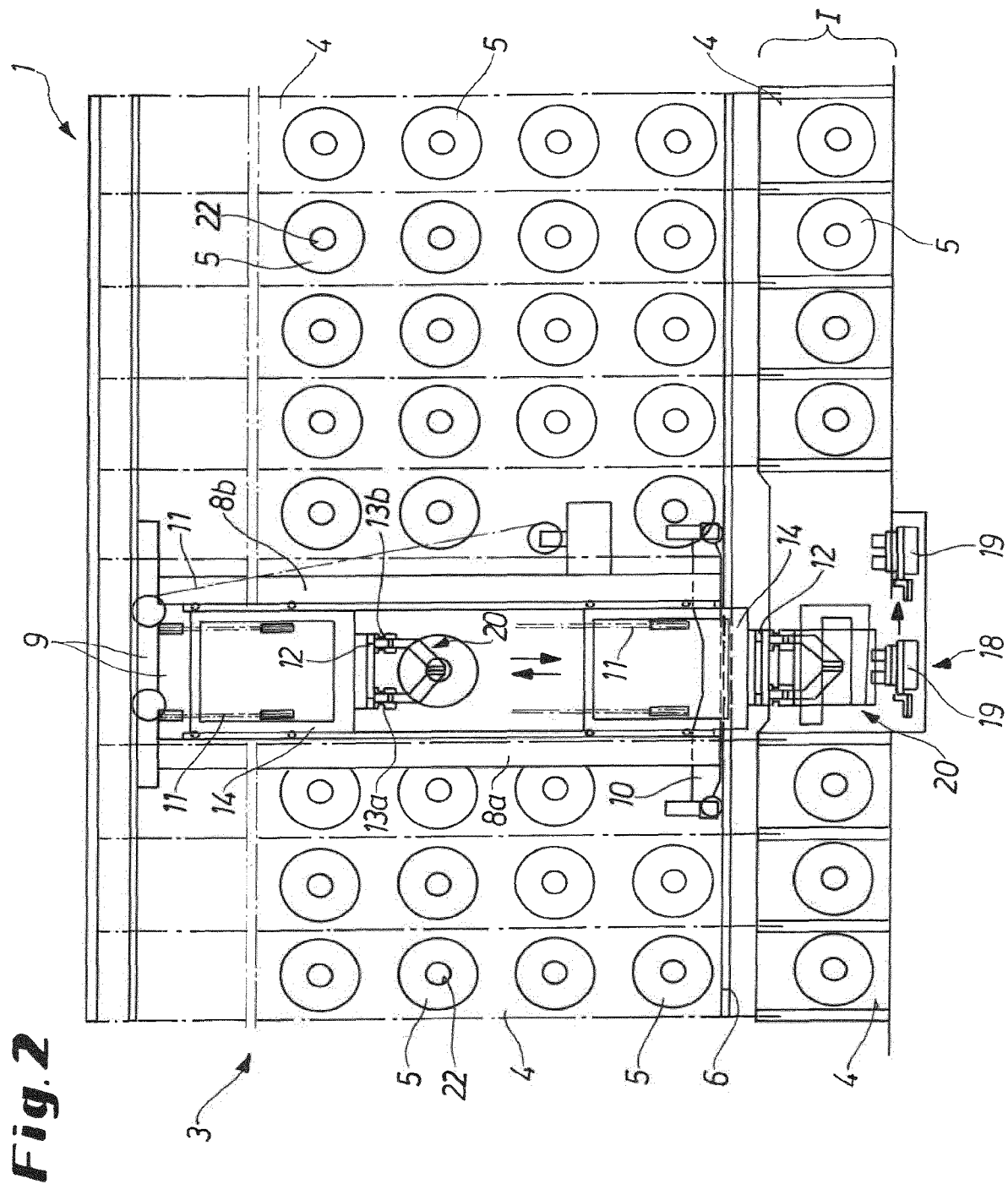
FIG. 2 shows the high-bay warehouse in a longitudinal section with a view onto a storage and retrieval unit movable in a lane extending in warehouse longitudinal direction.

The high-bay warehouse 1 shown in the embodiment consists of three storage modules 3, which are spaced from one another in width direction by a first lane 2a and a second lane 2b and which over the width/depth and height as well as over the length of the high-bay warehouse 1 and parallel to the lanes 2a, 2b have numerous rack bays 4 for the storage material 5, here coils (cf. FIG. 2). For storage and retrieval of the coils 5 a storage and retrieval unit 7 is movable in each lane 2a, 2b on elevated rails 6 provided above the lowermost rack bay plane, optionally on the warehouse foundation (cf. FIG. 1).

The storage and retrieval units 7 comprise a frame 8. The frame 8 comprises vertical uprights 8a, 8b which are connected by head and foot beams 9 and 10. The frame 8 extends over the height of the multi-floor storage modules 3. A lifting bridge (or hoist platform) 14 is guided at the vertical uprights. The lifting bridge 14 can be moved by way of the drive 11 (cable pulls running over rollers). The lifting bridge 14 supports at least one telescopic holder 13 (cf. FIG. 4) or 13a, 13b (cf. FIG. 6). The telescopic holder 13 is rotatable by way of a rotary ring 12 (as indicated in FIGS. 1 and 2) and movable gradually in and out orthogonally to the lane 2a, 2b for left-hand-side and right-hand-side servicing of the rack bays 4 of adjacent storage modules 3.

Figure 3:
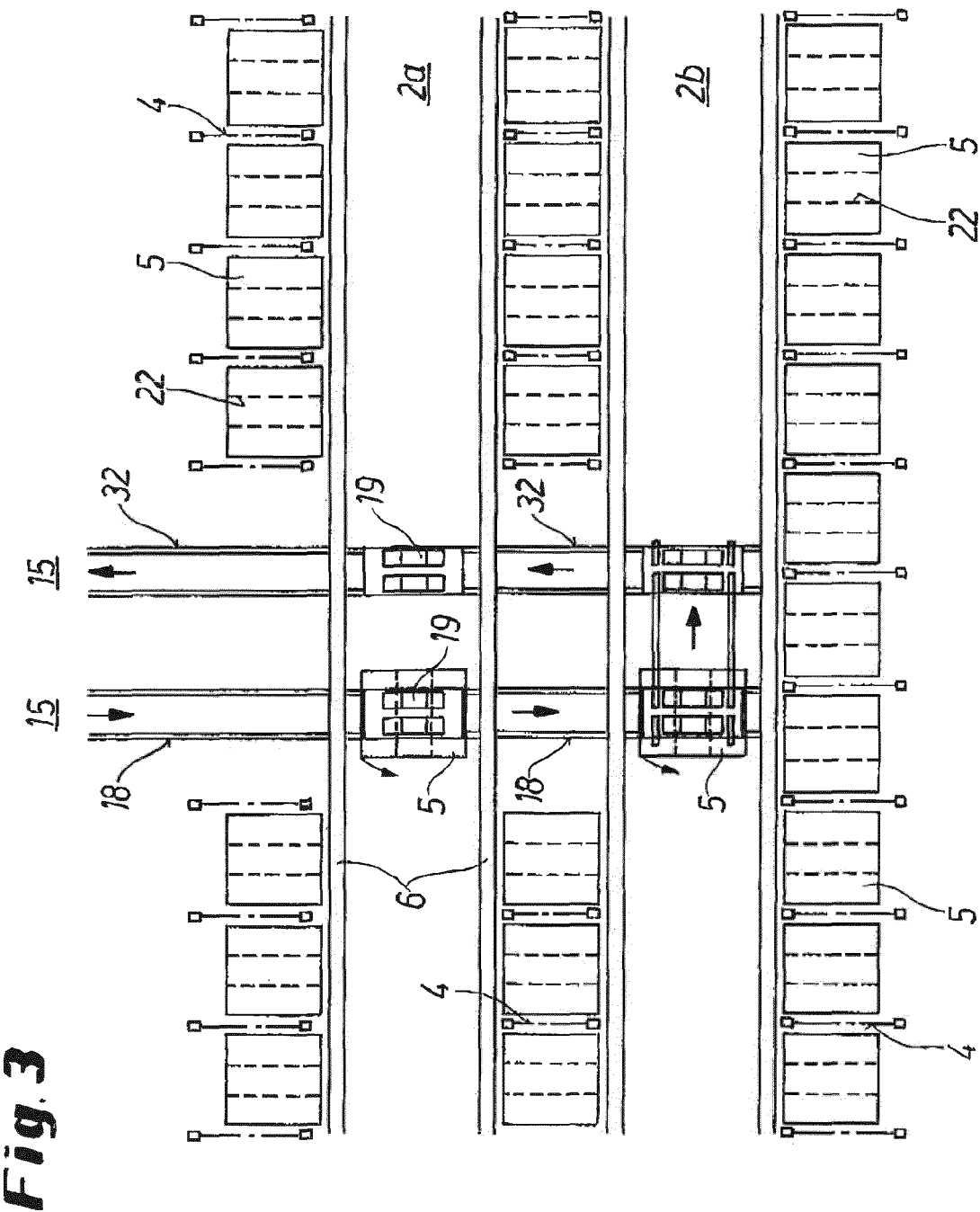
FIG. 3 shows the high-bay warehouse in a plan view as seen from above the lowermost rack bay plane or below the movable storage and retrieval unit.

As can be inferred from FIGS. 1 to 3, the lowermost rack bay plane 1 of the storage modules 3 following one another in a row is constructed, starting from a feed 15 at a longitudinal side of the high-bay warehouse 1 (cf. FIG. 3), with a transverse conveyor device 18, which is provided on the foundation 16 and consists of conveyor rollers 17 and which crosses the lanes 2a, 2b or opens thereinto. The coils 5 taken over from a coiler position of a rolling train (not illustrated) are brought by transport means to the feed 15 at the longitudinal side of the high-bay warehouse 1 by way of, for example, pallets 19 and deposited on the transverse conveyor device 18. The laden pallets 19 run on the conveyor rollers 17 of the transverse conveyor device 18, passing the rack bays 4 of the lowermost rack bay plane 1, to the first lane or to the second lane 2b, where they are taken over by the storage and retrieval unit 7 for distribution in the rack bays 4 of the storage modules 3.

Figure 4:
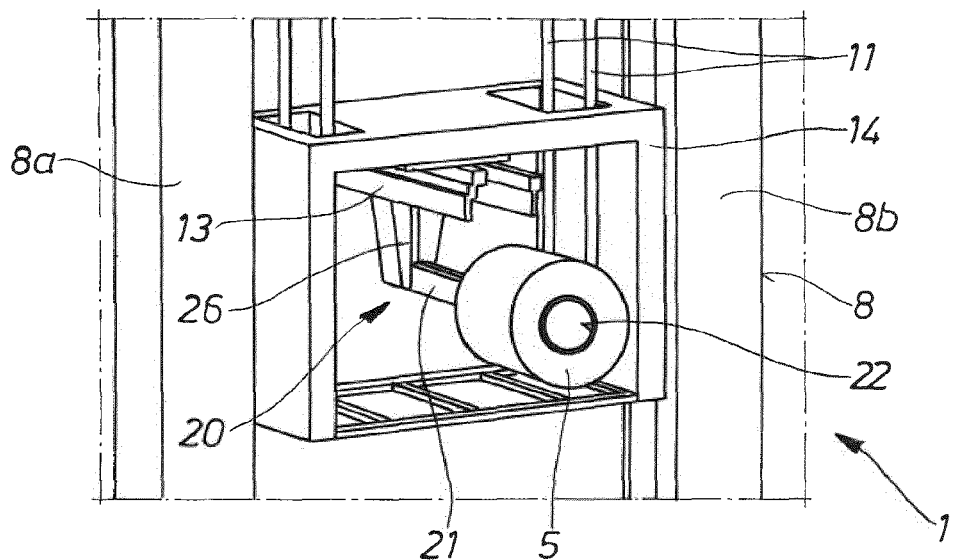
FIG. 4 shows, as a detail of a storage and retrieval unit, in a perspective front view the lifting bridge or hoist platform with telescopic holder secured thereto and C-shaped carrier arranged thereat, the horizontal web/mandrel of the carrier having received a coil.

Take-over of the coils 5 is carried out by at least one—as shown in FIG. 4—telescopic holder 13 which is secured to the lifting bridge 14 and which for that purpose is equipped with a C-shaped carrier 20, the horizontally extending mandrel 21 of which picks up the coil 5 by entry into the eye 22 thereof. The telescopic holder 13 consists, as can be inferred in more detail from FIG. 5, of a base housing or upper profile member 23 secured to the lifting bridge 14 and two telescopic thrust members which are arranged therein as center profile member 24 and lower profile member 25 and are movable in succession over rollers. The C-shaped carrier 20 is secured by way of its vertical web 26 to the lower profile member or inner telescopic thrust member 25. The telescopic holder 13 in the retracted starting position (cf. FIG. 4) makes possible an extremely space-saving transport and accordingly optimally narrow lanes 2a, 2b, but at the same time also a storage and retrieval stroke of desired length, for example 3,000 millimeters, depending on the respective design of the telescopic thrust members.

Figure 5:
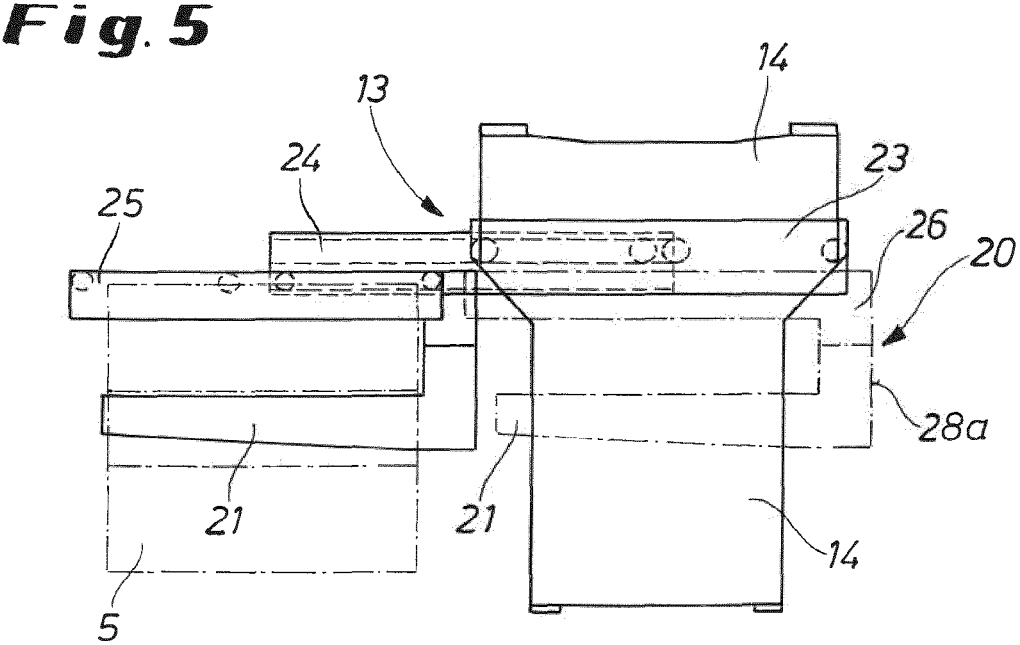
FIG. 5 shows, in a side view as a detail, the lifting bridge with telescopic holder and C-shaped carrier, illustrated in the right-hand image half by dot-dashed lines in the retracted end position and in the left-hand image half with the moved-out telescopic thrust members and a coil received by the mandrel of the C-shaped carrier.
Figure 6:
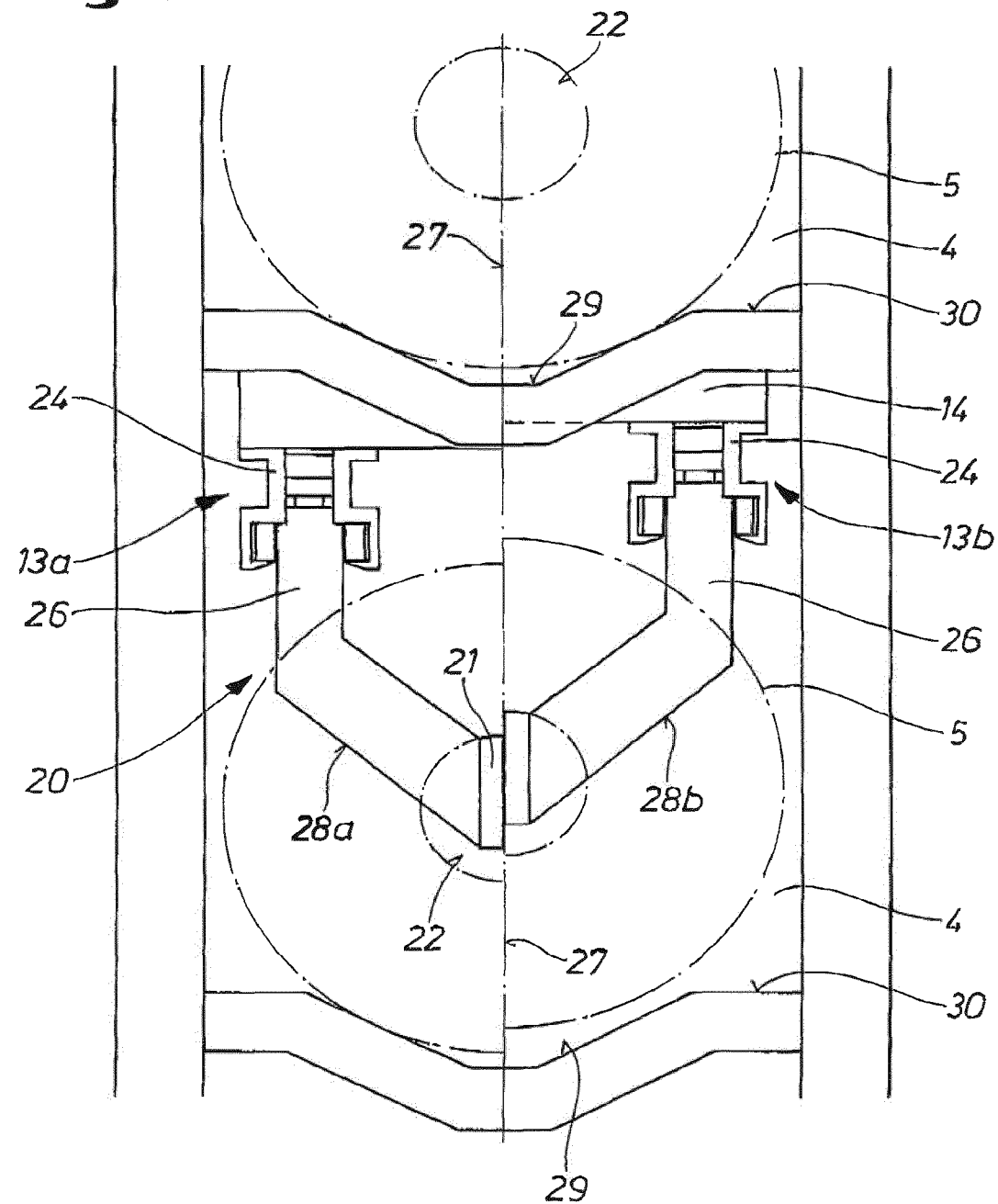
FIG. 6 shows, as seen from a rack bay, the C-shaped carrier positioned for storage of a coil and constructed at two horizontally spaced-apart telescopic holders in the mode of construction according to FIG. 5, illustrated in the right-hand image half with a coil or storage material hanging on the mandrel engaged into the eye and in the left-hand image half after deposit of the coil on a trough-like depression of the rack bay support.

FIG. 6 shows an embodiment of a storage and retrieval unit 7 with two telescopic holders 13a, 13b, which are arranged on the left and right near the vertical center axis 27 of the storage and retrieval unit 7 or the vertical center axis, which is coincident therewith, of the coil 5. The C-shaped carrier 20 here consists of two angle arms 28a, 28b, each of which is secured by its respective vertical web 26 to the lower profile member 25 or inner telescopic thrust member of one or the other telescopic holder 13a or 13b. The kinked portions of the two angle arms 28a, 28b run towards one another to an intersection at the vertical center axis 27. The horizontal mandrel 21 is arranged at this intersection. The thus-achieved spreading of the C-shaped carrier 20 makes it possible to utilize the free space for construction of a trough-like depression 29 of the coil support 30 in the rack bays 4 of the storage modules. As a result, for the same storage capacity the constructional height of the high-bay warehouse 1 can be appreciably reduced by comparison with rack bays with a planar coil support. FIGS. 1, 2 and 5 show such C-shaped carrier 20 coupled to two telescopic holders 13a, 13b.

The coils 5 are moved by the transverse conveyor device 18, with the eye 22 lying orthogonally to the transport direction in the shown embodiment. The coils are moved on the pallets 19 until they reach the lane 2a or 2b. The coils are stored in the rack bays 4 with the eye 22 lying in transport direction, which requires a 90° rotation of the C-shaped carrier 20, enabled by way of the rotary ring 12. For that purpose—in the example of the lane 2a of FIG. 1—the lifting bridge 14 with the retracted telescopic holders 13a, 13b and the C-shaped carrier 20 is lowered through a passage opening 13 in the foot beam 10 of the storage and retrieval unit 7 into the lowermost rack bay plane 1 and the mandrel 21 of the C-shaped carrier 20 is moved into the eye 22 of the coil 5 by moving out of the telescopic thrust members 24, 25. Thereafter, the telescopic thrust members 24, 25 are moved back again to the retracted starting position thereof (cf. FIG. 5). Then the drive 11 lifts the lifting bridge 14 with the coil 5 hanging on the mandrel 21 through the passage opening 31 in upward direction. The lifting bridge 14 is further elevated, until the coil 5 is in front of a free rack bay 4, which may also require movement of the storage and retrieval unit 7 in the lane 2a. Then, the C-shaped carrier 20 is rotated by 90° as indicated in FIG. 1 by solid lines. The coil 5 can then be stored in the rack bay 4 by gradual telescopic action. Retrieval is carried out in reverse sequence.

FIG. 1 shows, in the example of the rear lane 2b, the storage (or retrieval) of a coil 5 in a rack bay 4 disposed on the lowermost plane 1 of the high-bay warehouse 1 adjacent to the lowermost rack bay plane 1 by the transverse conveyor device 18 provided thereat (cf. also FIG. 2). When the lifting bridge 14 is lowered as also previously described for the lane 2a, the coil 5 is taken over by the C-shaped carrier 20 and also immediately rotated in this lowermost plane through 90°, as indicated by solid lines of the C-shaped carrier 20. In this rotated position of the coil 5 the storage and retrieval unit 7 moves on the elevated rails 6 until in front of a free rack bay 4 of the lowermost plane of the high-bay warehouse 1.

It can be inferred from FIG. 2 in conjunction with FIG. 3 that a circulatory system can be formed for the pallets 19, in that extending parallel to the transverse conveyor device 18 is a return path 32 on which empty pallets 19 can be transported back to the feed 15 for re-use after being moved out of the transverse conveyor device 18.

The storage and retrieval unit with the lifting bridge 14 lowerable through the foot beam 10 and the rotatable C-shaped carrier 20 allows in conjunction with the transverse conveyor device 18, which is constructed below the travel plane and here in a line of a lowermost rack bay plane 1 of the high-bay warehouse 1, a high throughput with reduced outlay and a compactly constructed high-bay warehouse 1.

The invention claimed is:
1. A high-bay warehouse (1), comprising:
a plurality of multi-floor storage modules (3), which are arranged in parallel longitudinal rows, wherein each multi-floor storage module of the plurality of multi-floor storage modules comprises a plurality of rack bays (4) disposed one above another, and wherein the multi-floor storage modules are separated from one another by lanes (2a, 2b) extending parallel to storage and retrieval sides of the rack bays or storage modules (3; 4); and storage and retrieval units (7) for storing and retrieving or repositioning a storage material (5), the storage material being coils of wound strips, at least one of the storage and retrieval units (7) being provided in each of the lanes (2a, 2b) and being movable back and forth, wherein the storage and retrieval units (7) have a frame (8) which corresponds at least with a height of the multi-floor storage modules and which has vertical uprights (8a, 8b) that are connected by head and foot beams (9; 10), wherein the vertical uprights (8a, 8b) guide a lifting bridge (14) which can be moved by a drive, wherein the lifting bridge (14) accommodates at least one telescopic holder (13; 13a, 13b) movable in and out orthogonally to the respective lane (2a, 2b) for left-hand-side and right-hand-side servicing of rack bays (4) of adjacent multi-floor storage modules (3), wherein the at least one telescopic holder (13; 13a, 13b) holds a C-shaped carrier (20) with a horizontally extending mandrel (21) that is configured to be moved into a coil eye of the storage material (5), wherein the C-shaped carrier (20) is connected to the lifting bridge (14) by a rotary ring (12) to which the at least one telescopic holder (13; 13a, 13b) is attached, wherein the at least one telescopic holder (13) comprises a left-hand side telescopic holder (13a) and a right-hand side telescopic holder (13b), wherein the C-shaped carrier (20) has two angle arms (28a, 28b), one of which extends from each the left-hand side telescopic holder (13a) and the right-hand side telescopic holder (13b) with a kink in direction towards a vertical center axis (27) of the storage and retrieval unit and ends thereat, and wherein the mandrel (21) is arranged at an intersection of the two angle arms (28a, 28b).

2. The high-bay warehouse according to claim 1, wherein the storage and retrieval units (7) have a frame-like passage opening (31) in the foot beams (10) for handling storage material (5) below their travel plane.

3. The high-bay warehouse according to claim 1,
further comprising a transverse conveyor device (18) that extends across at least some of the lanes (2a, 2b),
wherein the storage and retrieval units (7) are movable above the transverse conveyor device (18).

4. The high-bay warehouse according to claim 3,
wherein two rails (6) extend at a horizontal spacing from one another and are associated with the storage and retrieval units (7) in each lane (2a, 2b),
the two rails being arranged either on a warehouse floor or elevated at a height above the transverse conveyor device (18).

5. The high-bay warehouse according to claim 4, wherein the transverse conveyor device (18) is arranged on a lowermost rack bay plane (l).

6. A high-bay warehouse (1), comprising:
a plurality of multi-floor storage modules (3), which are arranged in parallel longitudinal rows,
wherein each multi-floor storage module of the plurality of multi-floor storage modules comprises a plurality of rack bays (4) disposed one above another, and wherein the multi-floor storage modules are separated from one another by lanes (2a, 2b) extending parallel to storage and retrieval sides of the rack bays or storage modules (3; 4); and storage and retrieval units (7) for storing and retrieving or repositioning a storage material (5), the storage material being coils of wound strips, at least one of the storage and retrieval units (7) being provided in each of the lanes (2a, 2b) and being movable back and forth, wherein the storage and retrieval units (7) have a frame (8) which corresponds at least with a height of the multi-floor storage modules and which has vertical uprights (8a, 8b) that are connected by head and foot beams (9; 10), wherein the vertical uprights (8a, 8b) guide a lifting bridge (14) which can be moved by a drive, wherein the lifting bridge (14) accommodates at least one telescopic holder (13; 13a, 13b) movable in and out orthogonally to the respective lane (2a, 2b) for left-hand-side and right-hand-side servicing of rack bays (4) of adjacent multi-floor storage modules (3), wherein the at least one telescopic holder (13; 13a, 13b) holds a C-shaped carrier (20) with a horizontally extending mandrel (21) that is configured to be moved into a coil eye of the storage material (5), further comprising a transverse conveyor device (18) that extends across at least some of the lanes (2a, 2b), wherein the storage and retrieval units (7) are movable above the transverse conveyor device (18).

7. The high-bay warehouse according to claim 6,
wherein two rails (6) extend at a horizontal spacing from one another and are associated with the storage and retrieval units (7) in each lane (2a, 2b),
the two rails being arranged either on a warehouse floor or elevated at a height above the transverse conveyor device (18).

8. The high-bay warehouse according to claim 7, wherein the transverse conveyor device (18) is arranged on a lowermost rack bay plane a).

9. The high-bay warehouse according to claim 6, wherein the C-shaped carrier (20) is secured to a rotary ring (12) of the lifting bridge (14).

10. The high-bay warehouse according to claim 9,
wherein the at least one telescopic holder (13) comprises a left-hand side telescopic holder (13a) and a right-hand side telescopic holder (13b), wherein the C-shaped carrier (20) has two angle arms (28a, 28b), one of which extends from each the left-hand side telescopic holder (13a) and the right-hand side telescopic holder (13b) with a kink in direction towards a vertical center axis (27) of the storage and retrieval unit and ends thereat, and wherein the mandrel (21) is arranged at an intersection of the two angle arms (28a, 28b).

* * * * *